United States Patent

Nagy et al.

[11] 3,905,258
[45] Sept. 16, 1975

[54] METHOD OF AND APPARATUS FOR HIGH SPEED SHEARING OFF OF WORKPIECES

[75] Inventors: István Nagy; Pál Sulyok; Iván Vas; István Virágh, all of Budapest, Hungary

[73] Assignee: Novex RT., Budapest, Hungary

[22] Filed: Oct. 2, 1973

[21] Appl. No.: 402,726

[30] Foreign Application Priority Data
Oct. 4, 1972   Hungary ............................. GE 926

[52] U.S. Cl. ..................... 83/13; 83/615; 83/616; 83/617
[51] Int. Cl. ..................... B23d 15/04; B26d 3/20
[58] Field of Search ............... 83/617, 615, 616, 13

[56] References Cited
UNITED STATES PATENTS

| | | | |
|---|---|---|---|
| 3,273,434 | 9/1966 | Hausman et al. | 83/617 X |
| 3,469,481 | 9/1969 | Cloup | 83/615 X |
| 3,487,736 | 1/1970 | Kaiser et al. | 83/617 X |

*Primary Examiner*—Frank T. Yost
*Attorney, Agent, or Firm*—Young & Thompson

[57] ABSTRACT

Method of and apparatus for high speed shearing off of workpieces, in which a movable blade is moved relative to a fixed blade to perform the shearing and the movable blade is actuated by a high speed ram. The ram is braked after the ram and movable blade have moved together a distance such that the movable blade has passed through about 10% of the thickness of the workpiece in the direction of shearing. Thereafter, the movable blade is braked after it has covered a distance about 10 to 50% of that thickness.

2 Claims, 3 Drawing Figures

METHOD OF AND APPARATUS FOR HIGH SPEED SHEARING OFF OF WORKPIECES

This invention relates to a method of and apparatus for high-speed shearing off of workpieces.

The shearing off of workpieces such as rod or bar material having a round or other cross-sectional profile, billets, etc., is usually carried out by mechanically or hydraulically driven machine tools, such as billet shears, presses, etc., eccentric presses usually being used for stamping or punching sheet metal.

Pneumatic presses with a piston rod have been proposed with which considerable dynamic effects can be obtained, the speed of the piston rod at the end of the operative stroke being as much as 10 metres per second. Shearing-off in the speed range attainable by these pneumatic presses results in very clean cut surfaces.

A considerable difficulty, however, is that the energy required for shearing-off is not completely dissipated by the shearing-off itself. The reason for this is that a certain energy is required for developing the speed at which cut surfaces of suitable quality can be obtained in the case of dynamic shearing off, and this energy is many times greater than that dissipated by the shearing off itself. The surplus energy is absorbed in the above mentioned apparatus by the tools thereof, particularly the blades, these parts consequently being considerably overloaded and subjected to considerable wear as a result of the relatively high forces and speeds of travel.

Embodiments of the invention obviate these disadvantages by dissipating surplus energy without involving the sensitive parts of the tools used for the shearing off operation.

According to one aspect of the invention there is provided a method of shearing off a workpiece using a fixed blade and a co-operating movable blade activated by a high speed ram wherein the ram is braked after it has covered a distance equivalent to approximately 10% of the extension of the workpiece in the direction of shearing, after the start of shearing.

According to a second aspect of the invention there is provided apparatus for shearing off a workpiece comprising: a fixed blade mounted for co-operation with a movable blade adapted to be activated by a high speed ram wherein resilient damping means are provided to brake the ram after it has covered a distance equivalent to approximately 10% of the extension of the workpiece in the direction of shearing, after the start of shearing.

In the embodiments of the invention there is no further energy transmission to the movable blade after braking of the ram so that the joint movement of the ram and of the movable blade is only for a fraction of the linear dimension in the direction of thrust of the cross-section of the workpiece. In this way, the non-dissipated kinetic energy of the ram is absorbed without involving the apparatus tools.

When shearing off steels at room temperature it is sufficient for the ram to contact the movable blade in a zone equal to approximately 10% of the linear dimension in the direction of thrust of the cross-section for shearing off. To reduce wear and friction it is also advantageous for the movable blade to cover a maximum of approximately 50% of the linear dimension of the cross-section for shearing off before it is completely braked. Thus the movable blade can be braked after having moved the first 10% of the linear dimension. As shearing off continues, movement of the ram and of the movable blade are not only superfluous but are actually disadvantageous since they entail a considerable wear. These disadvantageous movements are now eliminated in the embodiments of the invention by braking.

The resilient damping system may, for example, be mechanical or hydraulic. The resilient system may be disposed between the ram and the shearing off tool. Alternatively, the system may be disposed between the ram and a stationary part of the shearing off device, for example its stand, adapted to take the forces occurring in absorbing the energy. For example, if bars of approximately 10 mm diameter are to be sheared off, the transmission of the necessary energy to the movable blade is effected over a distance of about 1 mm, in which case the resilient damping system transmits the residual surplus energy of the ram, when the latter is stationary, to the shearing off device stand without involving the parts of the tool participating in the shearing off operation. In this way, after the movable blade has covered about 1 mm, it receives no further energy so that it moves on only under its own momentum.

Since the mass of the moving objects consisting of the ram and the blade decreases by the mass of the ram the momentum and energy of the movable blade that have to be absorbed to bring it to a stop are less. Nevertheless it is advantageous to further reduce the momentum of the movable blade and to reduce its travel, so that relative movements of the tool and workpiece and the resulting wear are obviated. This is done by the above mentioned braking. This means that the movable blade is not scraped along the uneven edge of the cut surface over the remaining 50% of the cross-section. Nor is there any scraping between the fixed blade and the sheared off workpiece.

Specific embodiments of the invention will now be described, by way of example, with reference to the accompanying drawings wherein.

Like parts have been given like reference numerals in the drawings.

Figure 1:
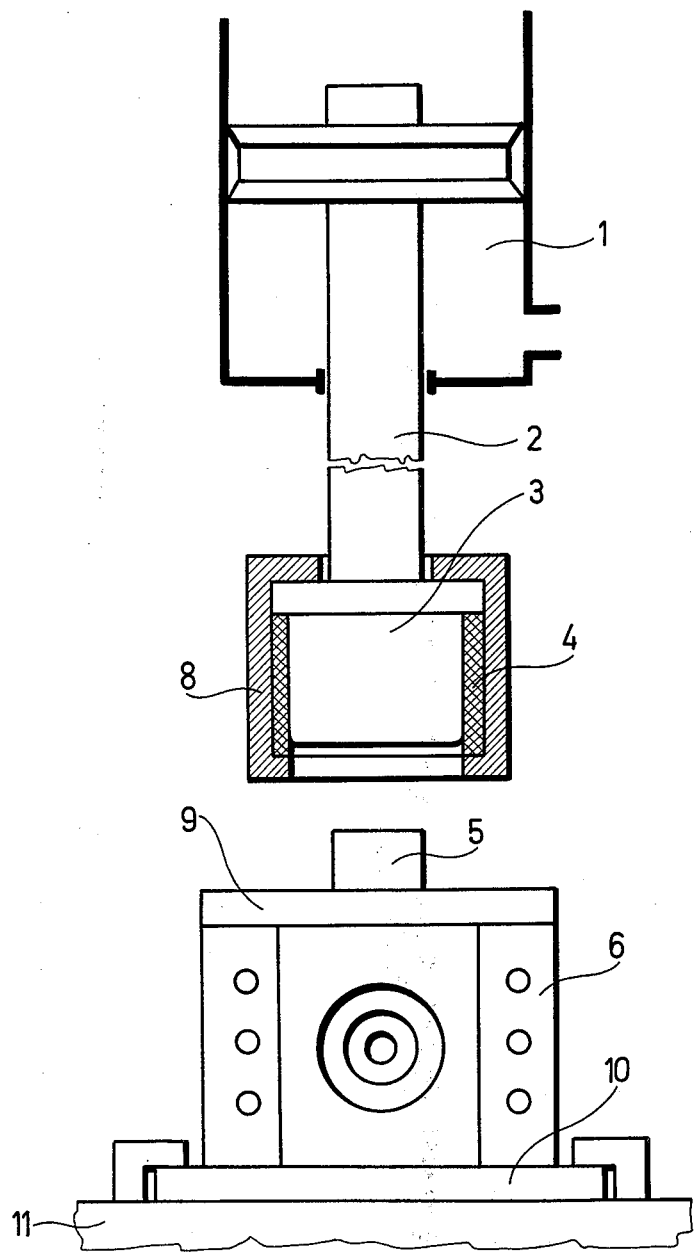
FIG. 1 is a partial section of a first embodiment, comprising an energy-absorbing damping system for a ram.

In FIG. 1, a cylinder 1 contains a piston, the rod 2 of which bears a ram 3 at its bottom end. The ram 3 is provided with an energy-absorbing resilient damping system which, in the embodiment illustrated consists of a rubber element 4. The rubber element 4 is secured to the ram 3 by means of a jaw 8. A shearing off tool 6 is fixed by means of a bottom closure member 10 onto a table 11, of a machine tool (not shown), and comprises a top closure member 9 and a movable blade 5.

The embodiment of FIG. 1 operates as follows:

During the shearing off, the ram 3 moves down and transmits part of its kinetic energy to the movable blade 5. The ram 3 initially during shearing moves together with the movable blade 5. This common movement continues until about 10% of the linear dimension of the cross-section to be sheared off has been traversed. The jaw 8 then strikes the top closure member 9, the ram 3 then being separated from the movable blade by means of the energy-absorbing damping system in the form of the rubber element 4.

Figure 2:
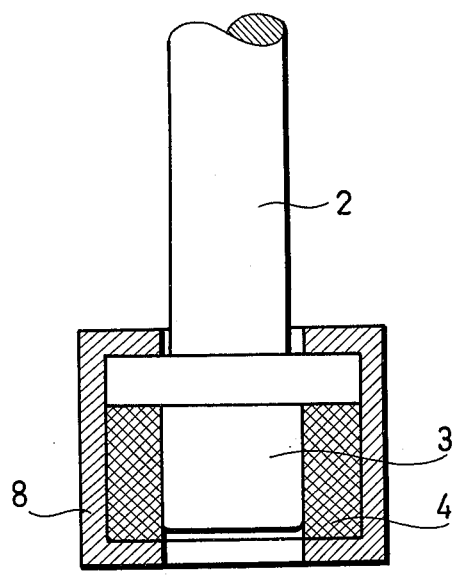
FIG. 2 is a similar view of another embodiment in which an energy-absorbing damping system is also provided between a movable blade and a stationary part of the apparatus.
Figure 2:
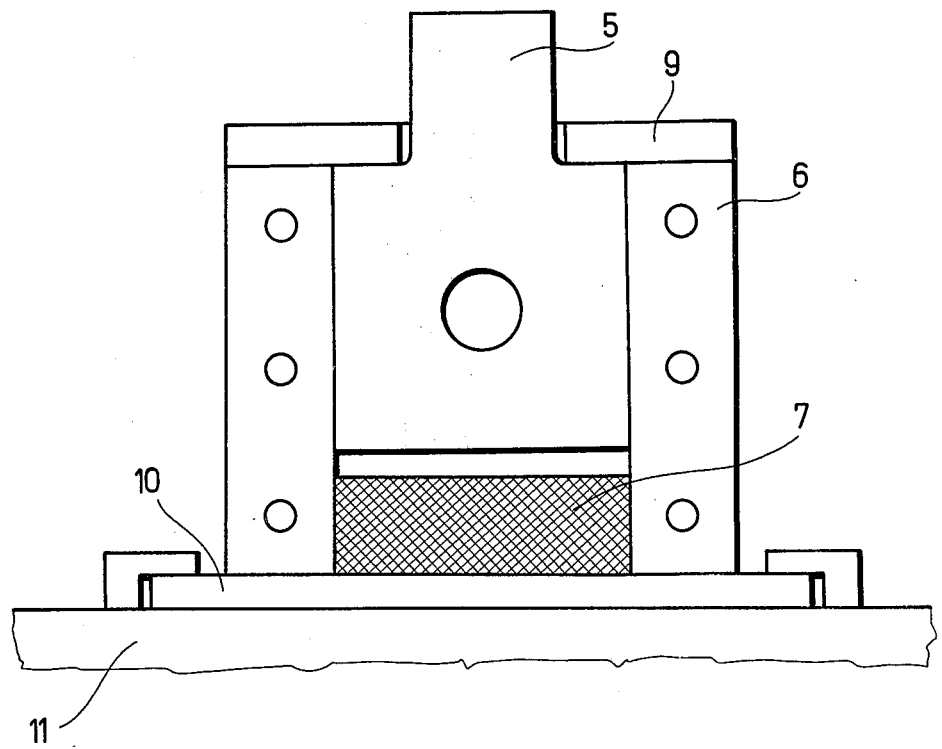

The embodiment shown in FIG. 2 differs from the preceding embodiment in that the tool 6 also contains an energy-absorbing resilient damping system in the form of a rubber element 7 which is disposed beneath the movable blade 5 and bears against the bottom closure member 10.

Figure 3:
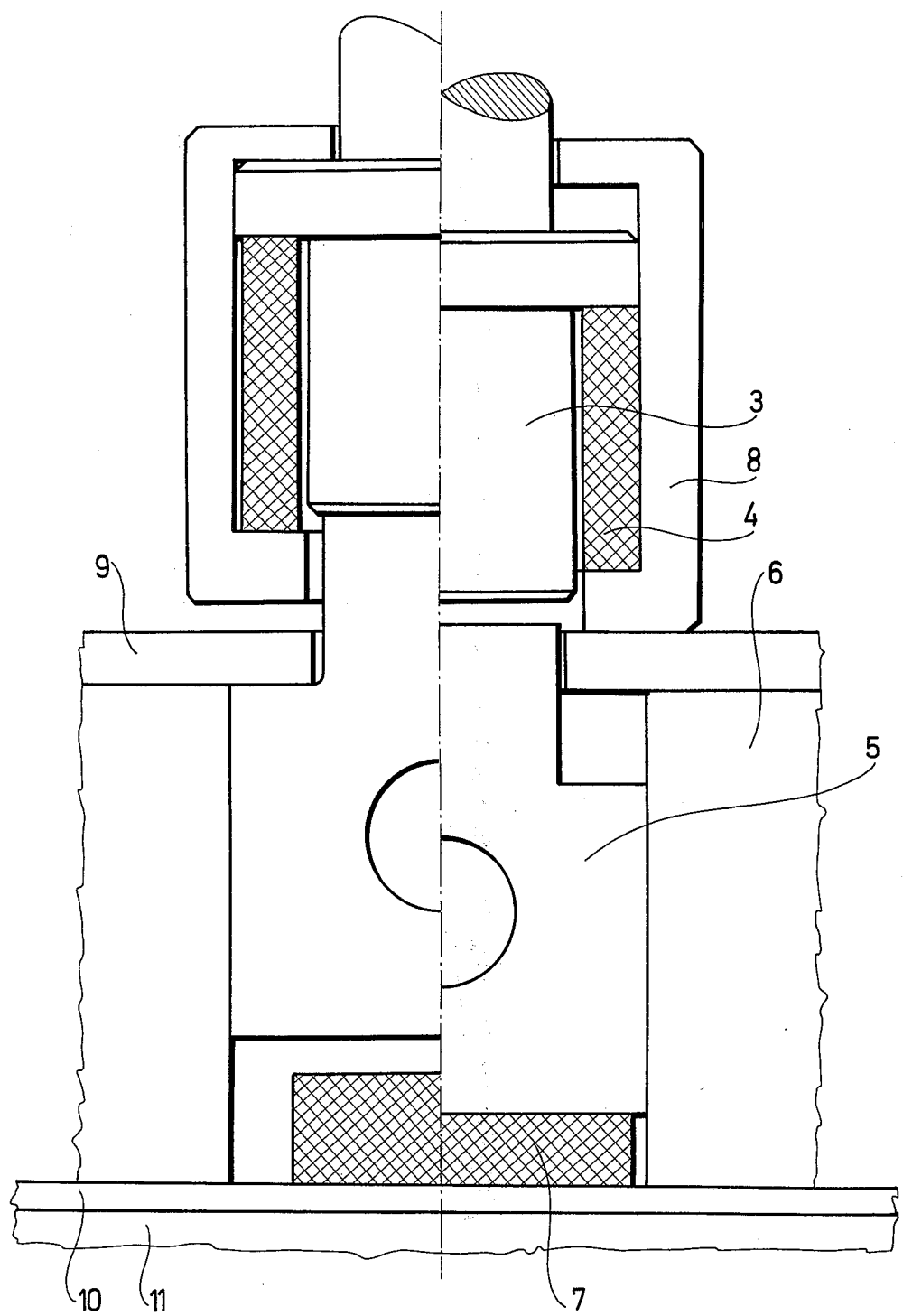
FIG. 3 shows different stages in the operation of the apparatus according to FIG. 2, to an enlarged scale.

The embodiment shown in FIG. 2 operates as follows, as illustrated in FIG. 3:

The left-hand side of FIG. 3 shows the position at the time when contact begins between the ram 3 and the movable blade 5. The right-hand side shows the ram 3 and the movable blade 5 in their bottom braked positions.

As the process begins, the movable blade 5 abuts the top closure member 9. After the ram 3 has acquired the kinetic energy required for shearing off, it reaches the top plane of the movable blade 5. The energy-absorbing damping system in the form of the rubber element 4 is in a position suitable for energy absorption.

As shearing off continues, the ram 3 and the movable blade 5 move jointly until about 10% of the linear dimension of the cross-section of the workpiece to be parted off has been covered, the jaw 8 then reaching the top plane of the top closure 9 of the tool 6.

As movement continues, the ram 3 is already braked its remaining kinetic energy being absorbed or dissipated by the energy-absorbing damping system, i.e. the rubber member 4. The movable blade 5 moves together with the sheared off piece of material under its own momentum.

The right-hand side of FIG. 3 shows the operative position in which the kinetic energy of the ram 3 has already been absorbed by the rubber element 4. The movable blade 5 has struck the rubber element 7 so that its kinetic energy has also been absorbed and dissipated.

It will be apparent that the method described ensures the speed and energy required for shearing off while providing a cut surface of excellent quality, the various disadvantageous consequences of overloading the shearing off tool being obviated at the same time. Friction between the movable and stationary blades is decreased considerably, and the same applies to the friction between the sheared off workpiece and the fixed and movable blades. This gives a considerable increase in tool life. In addition, the dynamic stresses on the ram, tools and machine tool stand can be greatly reduced.

Although the invention has been explained hereinbefore with reference to exemplified embodiments in which the energy-absorbing damping system is formed by rubber elements, the latter may be replaced by other resilient elements, for example springs, in which case the resilient damping system will consist of at least one spring. A hydraulic damping system is also possible.

Having described our invention, we claim:

1. A method of shearing off a workpiece between a fixed tool and a cooperating movable blade actuated by a high speed ram, comprising moving the ram and movable blade together until the movable blade has cut through about 10% of the thickness of the workpiece in the direction of shearing, braking the ram, and continuing the movement of the movable blade beyond the ram until the movable blade has covered a distance up to 50% of said thickness, and then braking the movable blade.

2. Apparatus for shearing off a workpiece, comprising a fixed tool, a movable blade adapted to move relative to the fixed tool to shear off the workpiece, a high speed ram for moving the movable blade, solid resilient damping means to brake the ram and separate the ram from contact with the movable blade when the ram and movable blade have travelled a distance such that the blade has cut through about 10% of the thickness of the workpiece in the direction of shearing, and solid resilient damping means adapted to brake the movable blade when the movable blade has covered a distance beyond the ram up to 50% of said thickness of the workpiece, the last-named damping means braking the movable blade after the first-named damping means has braked the ram whereby the blade moves on beyond the ram and the blade along, out of contact with the ram, completes the shearing off of the workpiece.

* * * * *